United States Patent Office 3,703,560
Patented Nov. 21, 1972

3,703,560
3,4-DIPHENYL-1-(4-HYDROXYPHENYL)-CYCLOPENTANE
Rudolf G. Griot, Florham Park, N.J., assignor to Sandoz-Wander, Inc., Hanover, N.J.
No Drawing. Original application July 8, 1968, Ser. No. 743,039, now Patent No. 3,598,860. Divided and this application Feb. 24, 1971, Ser. No. 118,519
Int. Cl. C07c 39/12
U.S. Cl. 260—619 D         1 Claim

ABSTRACT OF THE DISCLOSURE

The invention relates to 2-[4-(3′,4′-diphenylcyclopentyl)-phenoxy] lower aliphatic monocarboxylic acids and the corresponding lower alkyl esters, and to a process for their production. The compounds are useful as hypolyipidemics.

---

This application is a division of Ser. No. 743,039, filed July 8, 1968, now U.S. Pat. No. 3,598,860.

This invention relates to derivatives of aliphatic acids. In particular the invention pertains to 2-[4-(3′,4′-diphenylcyclopentyl)-phenoxy] lower aliphatic monocarboxylic acids and the corresponding lower alkyl esters. The invention also relates to intermediate useful in preparing said acids and esters as well as processes for preparing said intermediates and said acids and esters.

The substituted aliphatic acids and esters of the present invention may be represented structurally as follows:

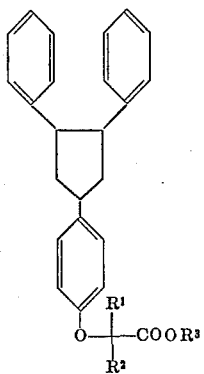

wherein each of $R_1$ and $R_2$ independently represents hydrogen or straight chain lower alkyl preferably containing from 1 to 4 carbon atoms, i.e., methyl, ethyl, propyl, and butyl; and $R_3$ represents hydrogen or straight or branched chain lower alkyl preferably containing from 1 to 4 carbon atoms, e.g., methyl, ethyl, propyl, isopropyl or butyl.

The compounds of Formula I are most conveniently prepared by reacting an alkali-metal salt of 4-(3′,4′-diphenylcyclopentyl)phenol with an appropriate 2-halo substituted aliphatic acid or ester as illustrated by the following reaction scheme:

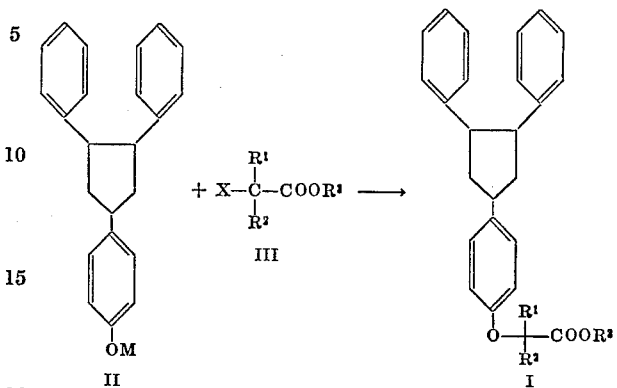

wherein $R_1$, $R_2$ and $R_3$ are as defined, X represents halogen having an atomic weight of from 35 to 127, i.e., chloro, bromo and iodo, and M represents an alkali-metal preferably sodium or potassium.

The above process is conveniently carried out in an inert organic solvent and at elevated temperatures. Preferably the reaction is carried out at a temperature of from about 20° C. to about 130° C. and in the same solvent employed for the preparation of the alkali-metal salt derivative of Formula II from the corresponding phenol discussed in further detail hereinafter. The resulting product (I) is readily recovered in conventional manner.

It will be readily appreciated by one skilled in the art that the compounds of Formula I wherein $R_3$ is hydrogen, i.e., the free acids, may also be obtained from the corresponding esters of Formula I (i.e., where $R_3$ is alkyl) by simple basic hydrolysis of the ester in conventional manner. The hydrolysis is conveniently carried out by treating the ester with an alcholic solution of an alkali-metal hydroxide, e.g., potassium hydroxide in methanol.

Various of the 2-halo substituted alkanoic acids and esters of Formula III employed in the above-illustrated process are known and can be prepared by methods described in the literature. Such others which may not be specifically described in the literature can be prepared from available material in analogous manner.

The alkali-metal salts of 4-(3′,4′-diphenylcyclopentyl) phenol (Formula II) are conveniently prepared by reacting the corresponding phenol with an alkali-metal hydride, e.g., sodium hydride or potassium hydride, at room temperature (20–25° C.) in an inert substantially anhydrous organic solvent. Suitable solvents include dimethylacetamide, diethylacetamide and dimethylformamide. As previously indicated hereinabove the solvent employed in preparing the phenolate is preferably employed in carrying out the subsequent reaction of the phenolate (II) with the appropriate 2-halo substituted alkanoic acid or ester (III). The preparation of the phenol, i.e., 4-(3′,4′,-diphenylcyclopentyl)phenol is illustrated in Example 1 hereinafter.

The compounds of Formula I are useful because they possess pharmacological activity in animals. In particular, the compounds are useful as hypolipidemic agents having hypocholesteremic and/or hypotriglyceridemic activity, as indicated by tests on a group of white rats which are given 10–50 mg. per kg. of body weight per diem of the compound orally, for six days, followed by extraction with isopropanol of serum or plasma after anesthetizing the rats with sodium hexobarbital, and then noting the cholesterol and triglyceride contents as compared to those of a control group. The cholesterol and triglyceride contents are determined by the methods described by Lofland, H. B., Anal. Biochem. 9:393 (1964): (Technicon method N 24a): and Kessler, G., and Lederer, H., Technicon Symposium, Mediad Inc., New York, pages 345–347 (1965), respectively. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 4 milligrams to about 30 milligrams per kilogram of animal body weight, preferably given in divided doses, 2 to 4 times a day, or in sustained release form. For most mammals the total daily dosage is from about 0.05 gram to about .4 gram of the compound, and the dosage forms suitable for internal use comprise from about 12.5 milligrams to about 200 milligrams of active compound in intimate admixture with a solid or liquid pharmaceutically acceptable carrier or diluent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents, and preserving agents, in order to provide an elegant and palatable preparation. Tablets may contain the active ingredient in admixture with conventional pharmaceutical excipients, e.g., inert diluents such as calcium carbonate, sodium carbonate lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hardfilled capsules and tablets.

The compounds of Formula I wherein $R_3$ is hydrogen (i.e. free acids) may be similarly administered in the form of their non-toxic pharmaceutically acceptable salts. Such salts do not materially differ from the free acid forms in their pharmacological effect and are included within the scope of the invention. As illustrative of such salts there may be included aluminum salt, non-toxic alkali metals salts, e.g., potassium and sodium salts; non-toxic alkaline earth metal salts, e.g., magnesium and calcium salts; salts with N-containing bases such as ammonium salts and pharmaceutically acceptable primary, secondary and tertiary amine salts, e.g., ethanol amine salts, diethanol amine salts, and the like. Such salts are prepared in conventional manner.

A representative formulation is a tablet prepared by conventional tabletting techniques and containing the following ingredients:

| Ingredient: | Weight (mg.) |
|---|---|
| 2-methyl-2-[4-(3',4'-diphenylcyclohexyl) phenoxy]propionic acid | 50 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

2-methyl-2-[4-(3',4'-diphenylcyclopentyl)phenoxy] propionic acid ethyl ester

Step A: Preparation of 3,4-diphenyl-1-(4-hydroxyphenyl)-cyclopentan-1-ol.—23.6 g. of 3,4-diphenyl-cyclopentan-1-one are added at 20° C. portionwise to 20.0 g. of p-hydroxy phenylmagnesium bromide (J.C.S. 93, 71) in 200 ml. of dry diethylether. After stirring at room temperature for 24 hours the reaction mixture is refluxed for another 6 hours. The mixture is cooled to −10° C. and an ice cold saturated solution of 100 ml. of ammonium chloride, is added slowly. The layers are separated and the organic phase washed twice, each time with 150 ml. of a saturated sodium chloride solution. The ether extract is then dried over magnesium sulfate, evaporated to dryness and the resulting crude title compound obtained.

Step B: Preparation of 3,4-diphenyl-1-(4-hydroxyphenyl)-cyclopentane.—The crude material from the previous step is dissolved in 75 ml. of glacial acetic acid, 2.0 g. of a catalyst composed of 5% palladium on charcoal are added thereto and the mixture hydrogenated at a temperature of 60° C. under 1500 p.s.i. hydrogen pressure. The hydrogenation is completed in approximately 12 hours and the amount of hydrogen introduced is approximately the stoichiometric amount. The resulting mixture is filtered and the solvent evaporated in vacuo. The residue is taken up in ethyl acetate, washed with sodium bicarbonate 2×50 ml. then twice with 100 ml. water and dried over magnesium sulfate. After evaporating the solvent, the residue is crystallized from hexane.

Step C: Preparation of 2-methyl-2-[4-(3',4'-diphenylcyclopentyl)phenoxy]propionic acid ethyl ester.—To 4.8 g. of sodium hydride (50% suspension in mineral oil) suspended in 200 ml. of dry dimethylacetamide is added portionwise with stirring and at room temperature 31.1 g. of 3,4-diphenyl-1-(p-hydroxyphenyl)cyclopentane. To the resulting mixture is added 20 g. of ethyl bromoisobutyrate and the mixture heated at 100° C. on a water bath for 24 hours. The solvent is then evaporated in vacuo and the residue taken up in 200 ml. of diethyl ether. The ether solution is then washed first with 200 ml. of water, then with 200 ml. of a saturated aqueous sodium bicarbonate solution and then dried over anhydrous magnesium sulfate. The ether is then evaporated off to obtain 2-methyl - 2-[4-(3',4'-diphenylcyclopentyl) phenoxy]propionic acid ethyl ester.

EXAMPLE 2

2-methyl-2-[4-(3',4'-diphenylcyclopentyl)-phenoxy] propionic acid

A mixture of 9 g. of 2-methyl-2-[4-(3',4'-diphenylcyclopentyl)-phenoxy]propionic acid ethyl ester, 2.0 g. of potassium hydroxide and 40 ml. of methanol is allowed to stand at room temperature for 3 days. The solvent is then evaporated in vacuo and the residue dissolved in water. The resulting solution is extracted twice with 50 ml. (each) of diethyl ether, and the combined ether extracts then acidified with 20 ml. of 2 N hydrochloric acid and extracted three times with 50 ml. (each) of a saturated aqueous sodium chloride solution. The organic phase is then dried over anhydrous magesium sulfate and the solvent evaporated to obtain 2-methyl-2-[4-(3',4'-diphenylcyclopentyl)-phenoxy]propionic acid.

What is claimed is:

1. 3,4-diphenyl-1-(4-hydroxyphenyl)-cyclopentane.

References Cited

Benze, W. L., et al.: J. Med. Pharm. Chem. 10(2), 1138–1144 (1967).

LORRAINE A. WEINBERGER, Primary Examiner

J. F. TERAPANE, Assistant Examiner